(12) United States Patent
Sorenson

(10) Patent No.: US 11,271,399 B1
(45) Date of Patent: Mar. 8, 2022

(54) POWER DISTRIBUTION APPARATUS WITH PRIORITIZED ELECTRICAL OUTLETS

(71) Applicant: Adam Sorenson, Lake Preston, SD (US)

(72) Inventor: Adam Sorenson, Lake Preston, SD (US)

( * ) Notice: Subject to any disclaimer, the term of this patent is extended or adjusted under 35 U.S.C. 154(b) by 330 days.

(21) Appl. No.: 14/687,977

(22) Filed: Apr. 16, 2015

Related U.S. Application Data

(60) Provisional application No. 61/980,382, filed on Apr. 16, 2014.

(51) Int. Cl.
*H02J 3/14* (2006.01)
*H02J 3/12* (2006.01)
*H02J 1/10* (2006.01)

(52) U.S. Cl.
CPC ...... *H02J 3/14* (2013.01); *H02J 1/10* (2013.01); *H02J 3/12* (2013.01)

(58) Field of Classification Search
CPC ...... H02J 3/14; H02J 3/12; H02J 1/00; H03K 17/722; H03K 17/0824
USPC ............... 307/31, 112, 36–39; 320/107, 165
See application file for complete search history.

(56) References Cited

U.S. PATENT DOCUMENTS

| | | | |
|---|---|---|---|
| 5,563,455 A * | 10/1996 | Cheng | H02J 3/14 307/41 |
| 5,565,714 A | 10/1996 | Cunningham | |
| 5,731,947 A | 3/1998 | Hirose | |
| 6,501,195 B1 | 12/2002 | Barton | |
| 6,759,763 B2 | 7/2004 | Barton | |
| 7,130,190 B1 | 10/2006 | Baker | |
| 7,132,763 B2 | 11/2006 | Rendic | |
| 7,193,335 B2 | 3/2007 | Palmer | |
| 7,504,745 B2 * | 3/2009 | Lee | H01R 13/6666 307/39 |
| 7,986,056 B2 | 7/2011 | Augur | |
| 8,148,908 B2 * | 4/2012 | Lai | H05B 33/0815 307/66 |
| 8,181,043 B1 | 5/2012 | Reynolds | |
| 8,190,940 B2 | 5/2012 | Gelonese | |
| 8,694,272 B2 * | 4/2014 | Ewing | H04Q 9/00 702/60 |
| 8,742,304 B2 * | 6/2014 | Emma | H05B 6/66 219/679 |

(Continued)

*Primary Examiner* — Dinh T Le
(74) *Attorney, Agent, or Firm* — Jeffrey A. Proehl; Woods, Fuller, Shultz & Smith, PC

(57) ABSTRACT

A power distribution system comprising a power input, and at least two controlled power outlets configured for connection to devices. The power outlets may include first and second power outlets, with at least the first power outlet having a first priority level and at least the second power outlet having a second priority level. A power sensing circuit may be configured to detect a level of power being drawn from a power supply circuit. A power control circuit may individually control power supplied to each power outlet such that power drawn from each outlet may be removed without removing power from another outlet. The power control circuit may be configured to remove power from at least one of the controlled power outlets according to the relative priority levels of the power outlets when a cumulative power draw level for the outlets may exceed a threshold cumulative power draw level.

20 Claims, 3 Drawing Sheets

(56) References Cited

U.S. PATENT DOCUMENTS

| | | | | |
|---|---|---|---|---|
| 8,935,011 | B2* | 1/2015 | Tischer | H02J 3/14 |
| | | | | 700/286 |
| 10,158,213 | B2* | 12/2018 | Burch | H02B 11/26 |
| 2013/0241284 | A1* | 9/2013 | Santini | H02J 4/00 |
| | | | | 307/31 |
| 2014/0325245 | A1* | 10/2014 | Santini | G06F 1/266 |
| | | | | 713/300 |

* cited by examiner

POWER DISTRIBUTION APPARATUS WITH PRIORITIZED ELECTRICAL OUTLETS

REFERENCE TO RELATED APPLICATIONS

This application claims the priority of U.S. Provisional Patent Application No. 61/980,382, filed Apr. 16, 2014, which is hereby incorporated by reference in its entirety.

BACKGROUND

Field

The present disclosure relates to power distribution apparatus and more particularly pertains to a new power distribution apparatus with prioritized electrical outlets for selectively providing power to devices connected to the apparatus.

SUMMARY

In one aspect, the present disclosure relates to a power distribution apparatus for providing power to electrical devices when connected to the apparatus, with the apparatus being configured to be connected to a power supply circuit. The apparatus may comprise a power input through which the apparatus receives power from the power supply circuit to be distributed, and at least two electrical controlled power outlets, with each of the controlled power outlets comprising the at least two controlled power outlets including a first power outlet and a second power outlet. The apparatus may also comprise a power sensing circuit in electrical communication with the power input and being configured to detect a level of power being drawn by the power input from the power supply circuit and generate a cumulative power draw signal corresponding to the power being drawn through the power input. The apparatus may further comprise a power control circuit in electrical communication with the at least two controlled power outlets and being configured to individually control power supplied to each of the controlled power outlets such that power drawn from each of the at least two controlled power outlets may be removed without requiring removal of power from another of the controlled power outlets. The power control circuit may be in communication with the power sensing circuit to receive the cumulative power draw signal for the power input. The apparatus may include a power switching circuit responsive to the power control circuit and configured to supply power to each of the electrical controlled power outlets and remove power from each of the controlled power outlets on an individual basis. The power control circuit may be configured to cause the power switching circuit to remove power from at least one of the controlled power outlets when a cumulative power draw level associated with the cumulative power draw signal equals or exceeds a threshold cumulative power draw level.

In another aspect, the disclosure relates to a power distribution apparatus for providing power to electrical devices when connected to the apparatus, with the apparatus being configured to be connected to a power supply circuit. The apparatus may comprise a power input through which the apparatus receives power from the power supply circuit to be distributed, and at least two electrical controlled power outlets, with each of the controlled power outlets comprising the at least two controlled power outlets including a first power outlet and a second power outlet. The apparatus may also comprise a power sensing circuit in electrical communication with each of the controlled power outlets and being configured to detect a level of power being drawn by any device connected to each respective controlled power outlets and generate an individual power draw signal corresponding to the power being drawn. The apparatus may further comprise a power control circuit in electrical communication with the at least two controlled power outlets and configured to individually control power supplied to each of the controlled power outlets such that power drawn from each of the at least two controlled power outlets may be removed without requiring removal of power from another of the controlled power outlets. The power control circuit may be in communication with the power sensing circuit to receive the individual power draw signals for the at least two controlled power outlets. The apparatus may include a power switching circuit responsive to the power control circuit and configured to supply power to each of the electrical controlled power outlets and remove power from each of the controlled power outlets on an individual basis. The power control circuit may be configured to cause the power switching circuit to remove power from at least one of the controlled power outlets when a cumulative power draw level associated with the cumulative power draw signal equals or exceeds a threshold cumulative power draw level.

In still another aspect, the disclosure relates to a power distribution apparatus for providing power to electrical devices when connected to the apparatus, with the apparatus being configured to be connected to a power supply circuit. The apparatus may comprise a power input through which the apparatus receives power from the power supply circuit to be distributed, and at least two electrical controlled power outlets, with each of the controlled power outlets comprising the at least two controlled power outlets including a first power outlet and a second power outlet, the first power outlet having a first priority level and the second outlet having a second priority level. The apparatus may also comprise a power sensing circuit in electrical communication with the power input and configured to detect a level of power being drawn by the power input from the power supply circuit and generate a cumulative power draw signal corresponding to the power being drawn through the power input. The apparatus may further include a power control circuit in electrical communication with the at least two controlled power outlets and configured to individually control power supplied to each of the controlled power outlets such that power drawn from each of the at least two controlled power outlets may be removed without requiring removal of power from another of the controlled power outlets. The power control circuit may be in communication with the power sensing circuit to receive the cumulative power draw signal for the power input. The apparatus may include a power switching circuit responsive to the power control circuit and configured to supply power to each of the electrical controlled power outlets and remove power from each of the controlled power outlets on an individual basis. The power control circuit is configured to cause the power switching circuit to remove power from a said controlled power outlet having a priority level less than the first priority level when a cumulative power draw level associated with the cumulative power draw signal equals or exceeds a threshold cumulative power draw level. For example, when the power draw exceeds the threshold cumulative power draw level, the apparatus preferentially removes power from one or more of the lowest priority controlled power outlets, but may remove power only from those which, upon removing power to said outlets, will eliminate the overload condition. In some implementations, still lower priority outlets may remain energized if the power draws of those power outlets may be too little to influence an overload condition.

In yet still another aspect, the disclosure relates to a power distribution apparatus for providing power to electrical devices when connected to the apparatus, with the apparatus being configured to be connected to a power supply circuit. The apparatus may comprise a power input through which the apparatus receives power from the power supply circuit to be distributed, and at least two electrical controlled power circuits, with each of the controlled power circuits comprising the at least two controlled power circuits including a first power circuits and a second power circuits. The apparatus may also comprise a power sensing circuit in electrical communication with the power input and being configured to detect a level of power being drawn by the power input from the power supply circuit and generate a cumulative power draw signal corresponding to the power being drawn through the power input. The apparatus may further include a power control circuit in electrical communication with the at least two controlled power circuits and configured to individually control power supplied to each of the controlled power circuits such that power drawn from each of the at least two controlled power circuits may be removed without requiring removal of power from another of the controlled power circuits. The power control circuit may be in communication with the power sensing circuit to receive the cumulative power draw signal for the power input. The apparatus may further include a power switching circuit responsive to the power control circuit and configured to supply power to each of the electrical controlled power circuits and remove power from each of the controlled power circuits on an individual basis. The power control circuit may be configured to cause the power switching circuit to remove power from at least one of the controlled power circuits when a cumulative power draw level associated with the cumulative power draw signal equals or exceeds a threshold cumulative power draw level.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
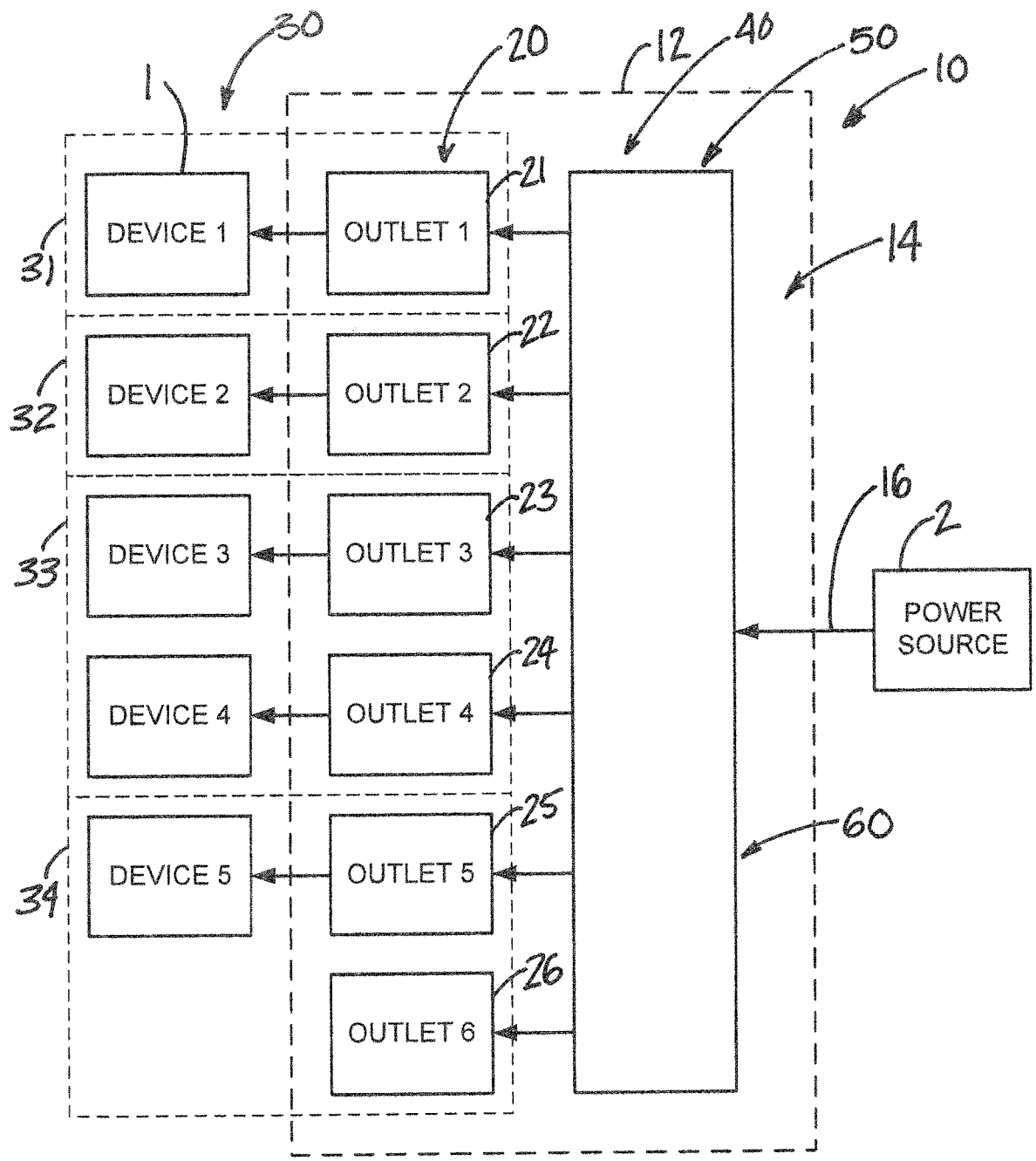
FIG. 1 is a schematic diagram of elements of a new power distribution apparatus with prioritized electrical outlets according to the present disclosure.
Figure 2:
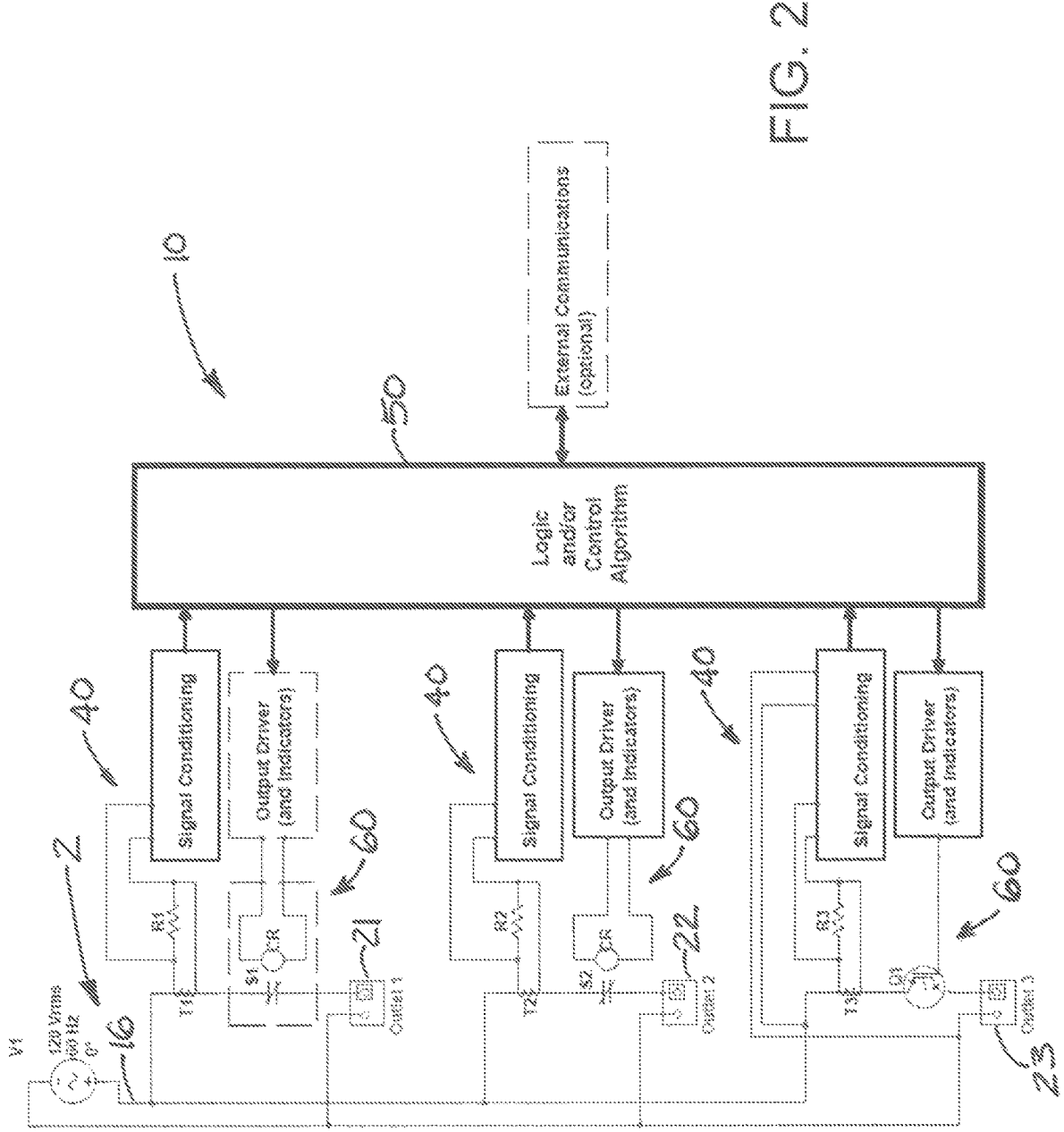
FIG. 2 is a schematic diagram of elements of the new power distribution apparatus, according to an illustrative embodiment of the disclosure in which the apparatus is relatively localized.
Figure 3:
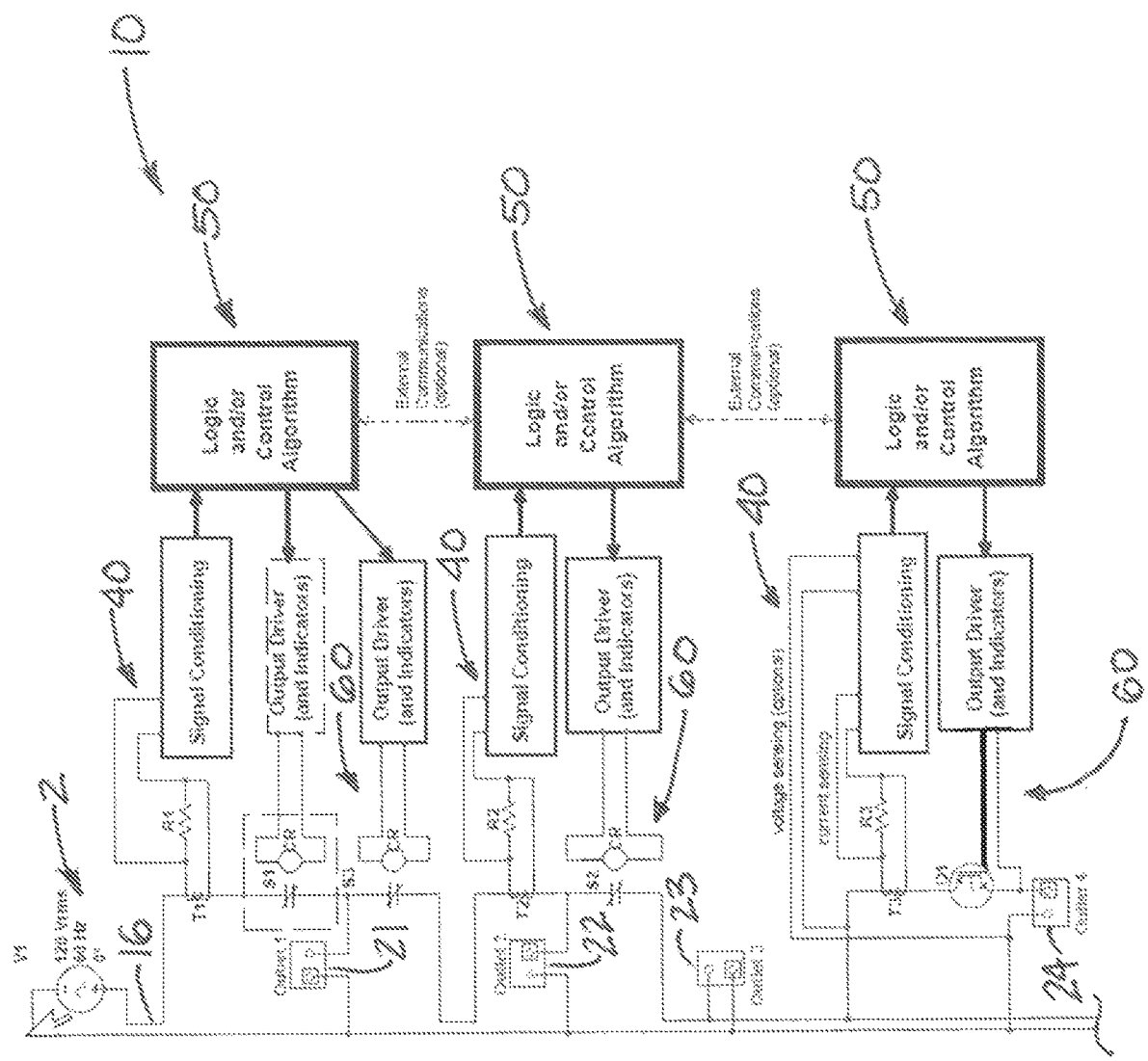
FIG. 3 is a schematic diagram of elements of the new power distribution apparatus, according to an illustrative embodiment of the disclosure in which the apparatus is relatively distributed about a structure circuit.

With reference now to the drawings, and in particular to FIGS. 1 through 3 thereof, a new power distribution apparatus with prioritized electrical outlets embodying the principles and concepts of the disclosed subject matter will be described.

Applicant has recognized that there is often a need for at least two or more or even several devices to operate on a single power supply circuit in which the total power draw by the devices (when simultaneously operating) might exceed a desirable or safe level of power draw from the circuit, and that an overload condition for the circuit may result that may lead to a tripped breaker, a blown fuse, or a fire in the building in which the circuit is located. And sometimes dividing the device loads among different power supply circuits may not be a feasible option or alternative.

Applicant has also recognized that the conventional fuse or circuit breaker employed for protecting the power supply circuit from a potentially dangerous overload condition is incapable of differentiating or discriminating between the various loads drawing power from the supply circuit. As a result, a fuse blowing or breaker tripping simply shuts down the power supplied to all loads on the circuit without regard to the relative importance of supplying power to the individual loads. Further, the fuse blowing or breaker tripping occurs without regard to how much the cumulative power load would actually need to be reduced to reach a relatively safe load level, such as by removing the power draw of one or more devices from the circuit while maintaining the power draw of one or more devices, including devices with a relatively higher priority or importance.

For example, the possibility of a power overload condition is particularly likely and problematic in situations where some or all of the device loads are appliances incorporating electrical resistance heaters, although virtually any electrically-powered device may contribute to an overload condition. Examples of devices that are relatively more likely to produce overload conditions, either alone or in combination with other devices, include large motors, such as those found in vacuum cleaners, heaters, kitchen appliances, air-conditioners, blow-dryers, curling irons, laser printers, large televisions, fridges or freezers.

Applicant has recognized that it would be desirable to allow multiple loads (such as appliances, heaters, and other devices) to operate on the same circuit without overloading it, and if an overload condition arises or is likely to arise, then to selectively and intelligently remove the supply of power to one or more of the loads to restore a safe operation condition without removing power from all of the loads being monitored and thus continuing to supply power to one or more of the loads on the circuit. Particularly useful is the capability to remove power from relatively less important loads first before resorting to removing power from relatively more important loads, with the relative importance of the loads being designated by the user or an algorithm, according to the application. Further, it would be desirable to automatically and intelligently restore power to the loads which were interrupted when an overload condition can be avoided by such resumption, such as when there is a decrease in the power requirements of the loads to which power supply was maintained.

As a practical example of the need for such a solution, consider several cooking appliances operating in a booth at a trade-show on a single power circuit. If these appliances each draw approximately 1500 W when the appliance's heating elements are heating up, the heating elements of only one appliance may heat at a time without overloading a conventional 15 or 20 amp circuit and causing a fuse to blow out or a circuit breaker to be tripped. In this example, when two or more of the appliances are attempting to heat up at the same time, it would be very advantageous to automatically remove or reduce the power supplied to one or more of the appliances while maintaining power supplied to another one or more, and then restoring power to the one or more appliances when the others are no longer drawing as much power for heating.

In some aspects, the disclosure relates to embodiments of a power distribution apparatus which has a plurality of outlets with an ability to automatically switch power to one or more of those outlets (and thus the devices connected to the outlets) on or off to avoid overload of the circuit supplying power to the apparatus having the outlets. Elements of the apparatus may monitor the power drawn by the apparatus from the power supply circuit and/or may monitor the power drawn by each of the devices connected to the respective outlets, such that when two or more devices connected to the outlets collectively draw more than a predetermined maximum power level, the power drawn may be reduced. The apparatus may reduce power to, or remove (e.g., cut off) power from, one or more of the outlets in a symmetric (e.g., substantially equal) or asymmetric (e.g., unequal) manner among the outlets, as necessary, to keep the cumulative power draw at or under the predetermined maximum power level. Once the power draw by the connected device or devices still receiving power is detected to have decreased sufficiently such that additional devices may be powered without exceeding the maximum power level, power may be restored to one or more of the outlets and connected devices from which power was withdrawn.

In this manner, the maximum power level may be exceeded in some cases for only for a very short time, if at all, until the apparatus detects an overload condition (or the potential for an overload condition) and reacts by removing power to one or more controlled power outlets(s). When multiple connected devices attempt to draw significant power through the apparatus to a degree which would normally cause an overload condition of the circuit, one or more of the connected devices may be promptly de-energized or minimally energized through the apparatus. Under some conditions, all connected devices may be provided power through the apparatus, but only one of, or a few of, the connected devices may be permitted to draw a significant amount of power or the full power required by device operation. When the power draw of one or more of the connected devices is reduced, then other connected devices may be permitted to increase their respective power draw to an extent that does not cause an overload condition.

In some embodiments, the limitation on power draw may be applied on an outlet by outlet—and thus a connected device by connected device—basis. This functionality may be implemented by having some or all of the outlets of the apparatus subject to an independently adjustable individual power draw threshold such that two or more power draw thresholds cannot be exceeded at the same time. This functionality may be implemented in conjunction with a collective maximum power draw threshold or limit for all outlets of the apparatus drawing power from the same circuit, so that the apparatus prevents an overload condition of the power supply circuit if the user sets individual thresholds for individual outlets that are collectively too high to maintain if all connected devices simultaneously draw the maximum power draw for the respective outlets.

In some embodiments, a time delay may be utilized from the time when an overload condition is sensed and the time power to one or more of the outlets of the apparatus is switched on or switched off, and the time delay may be of adjustable or of predetermined duration. This optional functionality may be useful to avoid conditions of cycling, surging, or rapid switching oscillation in providing power to the connected devices, as in some cases the maximum power limit may be exceeded only for a relatively short time period which may not cause an overload condition of the circuit but could be dangerous if maintained longer than the relatively short period of time represented by the time delay. For example, the initial starting current of an electrical motor can be much higher than when the motor reaches steady-state operation but may not represent a dangerous condition due to the relatively short time period that the starting current is drawn. A time delay may allow the apparatus to sense these short periods of high current without reacting until the high current condition lasts longer than the time delay.

In some embodiments, each outlet (and therefore any device connected to said outlet) can be assigned a priority, and more than one outlet may be assigned the same relative priority, although in the most preferred embodiments the highest relative priority may be assigned to a single outlet. As an illustrative example, devices may be connected to both relatively higher priority level priority 1 (P1) outlets and relatively lower priority level priority 2 (P2) outlets. If the devices connected to the P1 and P2 outlets draw enough power to cause an overload condition, power may be switched off to the P2 outlet(s) and connected device(s), while power continues to be supplied to the P1 outlet(s) and the connected device(s). The apparatus may also have outlets with lower relative priority levels than P1 and P2, such as relatively lower priority level priority 3 (P3) and even relatively lower priority level priority 4 (P4) and so on. The lower and lowest priority outlets may continue to receive power while the cumulative power draw by the connected devices does not exceed either the individual outlet power draw thresholds or the cumulative maximum power draw threshold for the circuit as applied to the circuit by the apparatus.

In some embodiments, a microcontroller may be employed to receive and process information supplied by sensors employed to sense the cumulative power draw by the apparatus and/or sensors employed to sense the power drawn through each outlet individually. The microcontroller may also be programmed or otherwise configured to apply relatively more complex algorithms to the switching of power on and off to the individual outlets and connected devices upon sensing an overload condition or a condition approaching overload. For example, rather than assigning a fixed priority level to each outlet, the microcontroller may function to optimize power draw of some or all of the connected devices that allows for the collective power draw to approach the maximum power draw for the circuit without exceeding the maximum power draw. The algorithms implemented by the microcontroller may control the time of day that one or more individual outlets may be switched on and the connected device receiving power, control the time period that the power to one or more individual outlets may be switched on and/or switched off, control which outlet(s) may never have power removed, and the like.

The apparatus may incorporate or communicate with sensors or detectors sensing parameters in addition to the sensors detecting power draw. For example, voltage sensors, heat sensors, arc-fault sensors, or ground-fault sensors could be utilized to further improve safety by increasing the awareness of the conditions that exist. The effect or impact of the additional sensors on operation may be configured by the user, and the sensors may even be caused to be ignored for a designated time period. For example, it may be desirable to temporarily bypass or adjust the threshold of an arc-fault or ground-fault sensor since these sensors may be triggered by inductance from motors or by moisture in heating-elements, which are merely examples of different conditions that might need to be temporarily ignored. The sensed parameters may be communicated to the user, such as by a display on the apparatus. Further, data or signals from sensors can be algorithmically processed to provide more meaningful information, either on an outlet by outlet basis or for all outlets combined. This information may include, for example, instantaneous or average power draw, total energy usage, power factor, leakage current, power "cleanliness" or spikes/fluctuations, amount of arcing, as well as other conditions, depending upon the types of sensors available. These calculated parameters could also be used to selectively switch power to the outlets according to predefined algorithms or scenarios.

In some implementations, the power factor could also be detected and used as another parameter for switching power to outlets. Such implementations could allow only one connected device to start operation at a time, such as, for example, only allowing one motor (or device having a motor) to start-up at one time or within one time period. As a practical example, when farmers run their grain bin fans, they must not all restart at the same time after a power outage, and sometimes bin fans must be started in a specific order to prevent electrical overloads. This same principal applies to factories running large electrical motors. Further, once the motor of one device has attained full speed, then a second device having a motor might be permitted to start.

In other implementations, power sensitive devices may be disconnected from power by the apparatus if the sourced power is potentially damaging to the device, such as if the sourced power is not "clean" enough, or if the power factor is above or below a certain threshold.

In some embodiments, the functionality described herein may be implemented into an apparatus such as a power strip with a block of outlets and a power connection cord that links the apparatus to an electrical wall receptacle of a structure having the power supply circuit, and thus the connection cord may be removably connected to the power receptacle. In other embodiments, the functionality may be implemented in an electrical wall receptacle that is an otherwise standard electrical wall receptacle or outlet, or even in a junction box utilized as a part of the structural wiring of a building, as well as any receptacles that are connected to the receptacle or junction box. The prioritized levels of power supply to receptacles of a circuit in a structure may thus be controlled to have the functions and advantages described herein. The control may be implemented using signals transmitted between various components (e.g., receptacles) of the system implementing the functionality described herein. This communication may be accomplished using a network that transmits signals in a wireless manner or in a wired manner, such as by utilizing the power conductors of the structural power system, or a separate signal conductor extending alongside the power conductors. Switching schemes may be implemented to allow relatively upstream receptacles, or receptacles closer to the ultimate power source (such as the power utility), to direct or control the behavior of relatively downstream receptacles.

In some implementations, some functionality of the system may be incorporated into the device connected to the apparatus or receptacles of the structural wiring system described, and the apparatus or system may communicate instructions to the device which may be directed to power consumption aspects of the device's operation. As an illustrative example, the apparatus may communicate to the connected device(s) an instruction to limit the power draw by the device(s) as required to prevent an overload condition for the circuit. A connected device that does not comply with the instruction, or is unable to receive the instruction and act accordingly, may be subject to having power limited or withdrawn when cumulative power loads of the devices require it.

Optionally, many of the aspects of the disclosure may be applied to other apparatus such as, for example, generators. Generators may incorporate these aspects to automatically avoid a generator from tripping a breaker when it is detected that overloading may occur, or, when it is detected that the generator is approaching a full-load. Further, the circuitry could be modified slightly to help smooth the power drawn from the generator to possibly avoid periods of full-load (or overload) followed by periods of light or no-load. Moreover, with the addition of sensors or feedback from the generator, the apparatus or structural wiring could utilize a variable maximum load threshold rather than a fixed or predetermined maximum. In such implementations, the generator may be able to raise the threshold and exceed the peak power draw for a short period of time, after which the maximum load threshold may be reduced.

Another apparatus that may utilize aspects of the disclosure is a power inverter apparatus, such as a 12 VDC to 120 VAC converter apparatus, to protect the inverter from an overload condition. The aspects of the disclosure provide functionality for avoiding an overload, and may utilize a finer level of control over which connected devices have power switched off and in what order power is removed.

Further, this system may be applied to a main breaker box or other power distribution box of a building, such as a home, factory, or motorhome. Use of the system may enable existing power infrastructure to handle more circuits and devices without risk of overload. For example, a 100 amp service could be hooked up to a 200 amp distribution box designed in accordance with the principles of this disclosure without any significant chance of overloading the service or the internal circuits. Renewable energy sources may also benefit from the application of the principles of the disclosure.

The algorithm applied by the apparatus may also be configured to supply or remove power to each outlet individually depending on predefined conditions, such as, for example, a power draw that is above or below a threshold, at certain times of the day, when particular other outlet(s) are drawing power or not drawing power, when heating or arcing or various components is sensed, according to the instantaneous price of power compared to an outlet's priority, and the like.

In the illustrative embodiment shown in FIG. 1 of the drawings, a power distribution apparatus 10 is depicted for providing power to electrical devices 1 when the devices are connected to the apparatus 10. The apparatus 10 may be configured to be connected to a power supply circuit 2 which supplies power to the apparatus which in turn supplies power to the devices connected to the apparatus. The apparatus may be configured to connect to a single or discrete circuit 2, although connection to two or more circuits may be utilized.

The illustrative apparatus 10 may include a housing 12 that defines an interior 14 for receiving various components of the apparatus 10. The apparatus 10 may also include a power input 16 through which the apparatus 10 receives power to be distributed, and the power input 16 may be configured to connect to the power supply circuit 2. in some embodiments, the power input 16 may be mounted on the housing and may include a power supply cord with, at least two electrical conductors and a power plug for removably connecting to a receptacle of the circuit 2 of a building.

The apparatus 10 may also include at least two electrical controlled power outlets 20. In the illustrative embodiments, each of the controlled power outlets 20 is mounted on the housing 12, but this is not critical to the disclosure. Each of the controlled power outlets may utilize a conventional electrical power receptacle configuration having at least two electrical conductors and being adapted to removably receive a power plug of a device 1. Illustratively, the controlled power outlets 20 may include a first power outlet 21 and a second power outlet 22, and may also include a third power outlet 23 and a fourth power outlet 24. Although not critical, the power outlets 20 may also include additional power outlets, such as a fifth power outlet 25 and a sixth power outlet 26.

The controlled power outlets may be assigned to more than one priority level 30, which are conceptually represented by broken line boxes in FIG. 1. In the illustrative embodiments, the first power outlet 21 may have a first priority level (indicated in FIG. 1 by box 31) and the second power outlet 22 may have a second priority level (indicated in FIG. 1 by box 32). Further illustratively, the third 23 and fourth 24 power outlets may both be included at a third priority level (indicated in FIG. 1 by box 33), and the fifth 25 and sixth 26 power outlets may share a fourth priority level (indicated in FIG. 1 by box 34).

The apparatus 10 may include power sensing circuitry 40 for sensing the power being drawn by the devices connected to the power outlets and operating. The power sensing circuitry 40 may be in electrical communication with various elements of the apparatus 10. In some embodiments, the power sensing circuitry is in communication with the power input 16 and may be configured to detect a level of power being drawn by or through the power input from the power supply circuit 2 and may also be configured to generate a cumulative power draw signal corresponding to the power being drawn through the power input. In some embodiments, the power sensing circuitry may be in electrical communication with each of the controlled power outlets and may be configured to detect a level of power being drawn by any device connected to each of the respective controlled power outlets and may also be configured to generate an individual power draw signal corresponding to the power being drawn through each of the power outlets 20. In some embodiments, the power sensing circuitry 40 may sense current drawn through the various elements of the apparatus 10, and in some embodiments the power sensing circuitry may also sense voltage across the elements.

The apparatus 10 may also include a power control circuit 50 that is in electrical communication with the controlled power outlets 20 and may be configured to individually control power supplied to each of the controlled power outlets such that power drawn from each of the controlled power outlets may be removed without removing power from another of the controlled power outlets. The power control circuit 50 may be in communication with the power sensing circuit 40 to receive, for example, the cumulative power draw signal for the power input and/or the individual power draw signals for the controlled power outlets.

In some implementations, the power control circuit 50 may be configured to remove power from at least one of the controlled power outlets when a cumulative power draw level associated with the cumulative power draw signal equals or exceeds a threshold cumulative power draw level, which would generally correspond to an overload condition of the power supply circuit or other predetermined threshold selected. The power control circuit 50 may also be adapted to remove power from one or more of the controlled power outlets having a priority level less than the first priority level, and initially that priority level less than the first priority level would be the relatively lowest priority level. For example, in the illustrative embodiments, the initial power removal may be from outlets at the fourth priority level, such as the fifth 25 and sixth 26 power outlets. In some implementations, a distinction may be made between the power outlets at a given priority level, and power removal may be made to only that power outlet or those power outlets at the priority level which significantly contribute to the overload condition, while other outlet(s) at the same priority level may remain powered up, particularly if the power draw by the loads associated with those outlets is relatively lesser or insignificant to the overload condition. Lower-priority power outlets with power draw levels that are relatively low (i.e., switching them off would not prevent nor end an overload condition) may be skipped over while moving to another priority level to remove power outlets at the higher priority level to ameliorate the overload condition.

Should this reduction in power draw be sufficient to reduce the cumulative power draw level below the threshold power draw level, then removal of power from further power outlets may not be necessary. If the cumulative power draw level remains equal to or above the threshold cumulative power draw level, then the power control circuit may withdraw power from power outlets of the lowest priority level that remains powered, such as in this example the outlets of the third priority (e.g., power outlets 23 and 24). The process may continue to additional lower priority level outlets until the power draw falls below the threshold. The steps outlined above may be executed in a very short time period, and may occur substantially simultaneously, such as where the power drawn through each of the individual power outlets is sensed and known, rather than only in a cumulative manner. In some implementations, the power control circuit 50 may be configured to remove power from at least one of the controlled power outlets 20 when a sum total of individual power draw levels associated with respective individual power draw signals equal or exceed the threshold cumulative power draw level. In some implementations, low priority outlets may remain energized when their contributions to the overall power draw are not enough to cause an overload. Low priority outlets may also be switched back on from an off state when their expected or anticipated contributions to overall power draw are not enough to cause an overload.

A single power control circuit 50 may control power supplied to all outlets of the apparatus, but in embodiments of the disclosure where multiple receptacles of a structure are controlled, the logic of the power control circuit may be distributed among a number of locations, such as the receptacles or junction boxes of the power supply circuit, and these circuits may be in communication with each other. If external communication between the elements of the power control circuit is lost or not implemented, the lowest priority receptacle(s) may detect the overload condition and switch off power to all downstream receptacle(s). With communication unavailable, the highest priority outlet in the daisy chain may be the outlet nearest the breaker box. After a time delay, if the overload condition persists, the next higher-priority receptacle may switch off power to receptacles downstream to it. Outlets and receptacles of relatively higher priority may have a slightly longer delay than relatively lower priority outlets or receptacles. The delay can be manually programmed or algorithmically determined.

Illustratively, when communication between the power control circuit controllers of the various outlets or receptacles is not available, power may be supplied to the circuit and all outlets or receptacles receive power (and each re-initializes if necessary). All outlets of the system may then switch off downstream power so that only the highest-priority outlet is able to supply power to a connected device. The system may then apply power to the downstream outlets and then recursively repeat the procedure until complete. The controller of each outlet may count the number of times that it has been switched ON/OFF to determine its priority in the system. The relatively higher the count by the outlet, then the relatively lower the outlet's priority in the system and the relatively shorter the period of the overload delay (within reasonable limits) for the outlet. Once determined, the delay for the outlet can be stored in non-volatile memory until it is manually reset when a prioritized outlet is removed or added to the system. When no external communication is available between the outlets, this sequence of decreasing delays places a practical limit on the useful number of prioritized outlets on the same circuit.

The apparatus may also include a power switching circuit 60 that may be configured to permit power to be supplied to each of the controlled power outlets on an individual basis and to block power from being supplied to each of the controlled power outlets on an individual basis.

The apparatus may also include means for configuring the priority of each of the outlets, such as, for example, a priority selector. In some embodiments, the priority selector may comprise an actuatable switch associated with one or more of the outlets to set the relative priority of the outlet with which the switch is associated. For example, a priority selector switch may have a first priority setting and a second priority setting, as well as a third and a fourth priority setting. In other embodiments, priority selection may be configured using software or firmware associated with the power control circuit 50.

In some implementations, aspects of the disclosure may be applied to a main or subsidiary breaker box or panel of a building which may have the benefit of increasing the total number of circuits available through the panel. For example, through the use of elements of the power distribution apparatus, a 50-Amp utility service drop may be able to supply power to the circuits of a 200-Amp breaker panel employing the prioritized power supply aspects of the disclosure. In such an application, the total power draw of the circuits of the 200-Amp panel may be monitored and limited to the maximum available from the service drop, in this example approximately 50 amps.

In some embodiments, each individual circuit associated with a circuit breaker of the circuit panel may be equipped with prioritizing circuitry of the disclosure. In other embodiments, the circuits of the breaker panel may be split or segregated into groups having a plurality of priority levels. In an illustrative example, the circuits of the breaker panel may be provided with four groups with each group having a different power supply priority level. In the example, the circuits of the lowest power priority levels may supply power to items such as a hot-water heater, a refrigerator, an air-conditioner, a heater, etc. while circuits of higher priority groups may include circuits providing power to all or most of the building's lights and outlets. Intermediate priority levels may be assigned to circuits providing power to things such as appliances, including washers, dryers, ovens, stoves, etc. Aside from residential buildings, aspects of this type of implementation may be applied, for example, to machinery shops which may utilize circuits with lower priority for operating, for example, air compressors, heaters, and the like. Aspects may also be applied to the provision of power to an entire farmyard, cycling the supply of power to dryer bins, well pumps, building heaters, shop equipment, and the farm household, as needed, if the available power is limited.

In some implementations, the provision of power to circuits may also factor in the price of electricity, either on instantaneous or a time-averaged basis as well as depending on priority levels of energized circuits. Illustratively, relatively low priority circuits (with devices of lower priority) may be set as being more price-sensitive, or more likely to be shut off at relatively higher price levels, and may only be energized when electricity rates are relatively lower, or below a particular threshold. or may be energized briefly when rates are higher or above the threshold.

Optionally, the provision of power to a particular device or circuit may not only be based upon the actual current power consumption of the device (or devices on the circuit), but also based upon the expected power usage for a device or devices that are not currently "on" and drawing power, The expected power draw may be based upon, for example, the power draw of the device during the last time that the device was "on" and the device was drawing power (or for a circuit, the last cumulative power draw by devices on the circuit), as that power draw level may be a reasonable and relatively accurate predictor of future power draw by the device or devices on the circuit.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A power distribution apparatus for providing power to electrical devices when connected to the apparatus, the apparatus being configured to be connected to a power supply circuit, the apparatus comprising:
   a power input through which the apparatus receives input power from the power supply circuit to be distributed;
   at least two electrical controlled power outlets including a first power outlet and a second power outlet;
   a power sensing circuit in electrical communication with the power input and being configured to detect a cumulative level of the input power being drawn by the power input from the power supply circuit, the power sensing circuit being further configured to generate a cumulative power draw signal corresponding to the cumulative level of the input power being drawn through the power input;
   a power control circuit in electrical communication with the at least two controlled power outlets and configured to individually control each portion of the input power supplied to each of the controlled power outlets such that each said portion of the input power drawn from each of the at least two controlled power outlets may be removed without requiring removal of another said portion of the input power from another of the controlled power outlets, the power control circuit being in communication with the power sensing circuit to receive the cumulative power draw signal for the power input; and
   a power switching circuit responsive to the power control circuit and configured to supply each said portion of the input power to each of the electrical controlled power outlets and remove a said portion of the input power provided to each of the controlled power outlets independent of provision of a said portion of the input power to other said controlled power outlets;
   wherein the power control circuit is configured to cause the power switching circuit to reduce the portions of the input power provided to each of the at least two controlled power outlets in a symmetric manner among the controlled power outlets when a cumulative power draw level associated with the cumulative power draw signal equals or exceeds a threshold cumulative power draw level.

2. The apparatus of claim 1 additionally comprising a housing defining an interior, and the at least two electrical controlled power outlets are mounted on the housing.

3. The apparatus of claim 1 wherein the power input is configured to removably connect to the power supply circuit.

4. The apparatus of claim 3 wherein the power input including a power supply cord.

5. The apparatus of claim 1 wherein each of the at least two electrical controlled power outlets are mounted on the housing.

6. The apparatus of claim 1 wherein reduction of the portion of the input power provided to each of the at least two controlled power outlets is substantially equal.

7. A power distribution apparatus for providing power to electrical devices when connected to the apparatus, the apparatus being configured to be connected to a power supply circuit, the apparatus comprising:
   a power input through which the apparatus receives input power from the power supply circuit to be distributed;
   at least two electrical controlled power outlets including a first power outlet and a second power outlet;
   a power sensing circuit in electrical communication with each of the controlled power outlets and being configured to detect a level of the input power being drawn by any device connected to each respective controlled power outlets, the power sensing circuit being further configured to generate an individual power draw signal corresponding to a portion of the input power being drawn by the device connected to the respective controlled power outlet;
   a power control circuit in electrical communication with the at least two controlled power outlets and configured to individually control each portion of the input power supplied to each of the controlled power outlets such that each portion of the input power drawn from each of the at least two controlled power outlets may be removed without requiring removal of another said portion of the input power from another of the controlled power outlets, the power control circuit being in communication with the power sensing circuit to receive the individual power draw signals for the at least two controlled power outlets and monitor the individual power draw signals and the portions of the input power being drawn by the device connected to each of the respective controlled power outlets, a summation of the individual power draw signals providing a cumulative power draw signal representative of a cumulative power draw level from the power input; and
   a power switching circuit responsive to the power control circuit and configured to supply each said portion of the input power to each of the electrical controlled power outlets and remove a said portion of the input power provided to each of the controlled power outlets independent of provision of a said portion of the input power to other said controlled power outlets;
   wherein the power control circuit is configured to cause the power switching circuit to automatically remove the portion of input power from at least one of the controlled power outlets when the cumulative power draw level associated with the cumulative power draw signal equals or exceeds a threshold cumulative power draw level, the power control circuit performing said removal of the portion of input power from the at least one controlled power outlet without removing the portion of input power from another one of the controlled power outlets and continuing to supply the portion of input power to said another one of the controlled power outlets; and wherein the power control circuit is configured to cause the power switching circuit to automatically restore the portion of the input power to the at least one of the controlled power outlets when the cumulative power draw level associated with the cumulative power draw signal no longer equals or exceeds the threshold cumulative power draw level.

8. The apparatus of claim 7 additionally comprising a housing defining an interior, and the at least two electrical controlled power outlets are mounted on the housing.

9. The apparatus of claim 7 wherein the power input is configured to removably connect to the power supply circuit.

10. The apparatus of claim 9 wherein the power input including a power supply cord.

11. The apparatus of claim 7 wherein each of the at least two electrical controlled power outlets are mounted on the housing.

12. The apparatus of claim 7 wherein the power control circuit is configured to determine an average power draw of the device connected to each of the respective controlled power outlets; and
restoration of the portion of input power to the at least one of the controlled power outlets is based upon an expected power usage of the device connected to the at least one of the controlled power outlets, the expected power usage being derived from the average power draw of the any device connected to controlled power outlet.

13. A power distribution apparatus for providing power to electrical devices when connected to the apparatus, the apparatus being configured to be connected to a power supply circuit, the apparatus comprising:
a power input through which the apparatus receives input power from the power supply circuit to be distributed;
at least two electrical controlled power outlets including a first power outlet and a second power outlet, the first power outlet having a first priority level and the second outlet having a second priority level, the first priority level having a higher priority than the second priority level;
a power sensing circuit in electrical communication with the power input and configured to detect a cumulative level of the input power being drawn by the power input from the power supply circuit, the power sensing circuit being further configured to generate a cumulative power draw signal corresponding to the cumulative level of the input power being drawn through the power input;
a power control circuit in electrical communication with the at least two controlled power outlets and configured to individually control each portion of the input power supplied to each of the controlled power outlets such that each said portion of the input power drawn from each of the at least two controlled power outlets may be removed without requiring removal of another said portion of the input power from another of the controlled power outlets, the power control circuit being in communication with the power sensing circuit to receive the cumulative power draw signal for the power input;
a power switching circuit responsive to the power control circuit and configured to supply each said portion of the input power to each of the electrical controlled power outlets and remove a said portion of the input power provided to each of the controlled power outlets independent of provision of a said portion of the input power to others said controlled power outlets;
wherein the power control circuit is configured to cause the power switching circuit to remove the portion of the input power from a said controlled power outlet without removing the portion of input power from another one of the controlled power outlets and continuing to supply the portion of input power to said another one of the controlled power outlets;
wherein the power control circuit is configured to apply priorities to removal of the portion of the input power from the at least one of the controlled power outlets when the cumulative power draw level associated with the cumulative power draw signal equals or exceeds the threshold cumulative power draw level;
wherein the power control circuit is configured to remove the portion of input power from a said controlled power outlet with a relatively lower priority before removing the portion of input power from a said controlled power outlet with a relatively higher priority; and
wherein the power control circuit is configured to remove the portion of input power from a said controlled power outlet with a relatively higher priority before removing the portion of input power from a said controlled power outlet with a relatively lower priority when removal of the portion of input power from the controlled power outlet with the relatively lower priority would reduce the cumulative power draw level to an extent such that the cumulative power draw level would not equal or exceed the threshold cumulative power draw level and removal of the portion of input power from the controlled power outlet with a relatively higher priority would reduce the cumulative power draw level to an extent such that the cumulative power draw level would not equal or exceed the threshold cumulative power draw level.

14. The apparatus of claim 13 additionally comprising a priority selector in communication with the power control circuit and being configured to receive a priority input indicating a relative priority for at least one of the controlled power outlets.

15. The apparatus of claim 14 wherein a said priority selector is associated with at least two of the controlled power outlets, the priority selector having a first priority setting corresponding to the first priority level and a second priority setting corresponding to the second priority level.

16. The apparatus of claim 13 wherein the at least two controlled power outlets include a third controlled power outlet having a third priority level.

17. The apparatus of claim 16 wherein the at least two controlled power outlets include a fourth controlled power outlet having a fourth priority level.

18. The apparatus of claim 16 wherein the power input is configured to removably connect to the power supply circuit.

19. The apparatus of claim 13 wherein each of the at least two electrical controlled power outlets comprises a power receptacle having at least two electrical conductor configured to removably receive a power plug of a device.

20. A power distribution apparatus for providing power to electrical devices when connected to the apparatus, the apparatus being configured to be connected to a power supply circuit, the apparatus comprising:
a power input through which the apparatus receives power from the power supply circuit to be distributed;
at least two electrical controlled power circuits including a first power circuit and a second power circuit;

a power sensing circuit in electrical communication with the power input and being configured to detect a cumulative level of the input power being drawn by the power input from the power supply circuit, the power sensing circuit being further configured to generate a cumulative power draw signal corresponding to the cumulative level of the input power being drawn through the power input;

a power control circuit in electrical communication with the at least two controlled power circuits and configured to individually control each portion of the input power supplied to each of the controlled power circuits such that each said portion of the input power drawn from each of the at least two controlled power circuits may be removed without requiring removal of another said portion of the input power from another of the controlled power circuits, the power control circuit being in communication with the power sensing circuit to receive the cumulative power draw signal for the power input; and a power switching circuit responsive to the power control circuit and configured to supply each said portion of the input power to each of the electrical controlled power circuits and remove a said portion of the input power provided to each of the controlled power circuits independent of provision of a said portion of the input power to other said controlled power outlets;

wherein the power control circuit is configured to cause the power switching circuit to remove power from at least one of the controlled power circuits when a cumulative power draw level associated with the cumulative power draw signal equals or exceeds a threshold cumulative power draw level, the power control circuit performing said removal of the portion of input power from the at least one controlled power outlet without removing the portion of input power from another one of the controlled power outlets and continuing to supply the portion of input power to said another one of the controlled power outlets; and wherein the power control circuit imposes a time delay between a time when the power control circuit initially detects that the cumulative power draw level has equaled or exceeded the threshold cumulative power draw level and a time when the power control circuit initially causes the power switching circuit to remove the portion of the input power from the at least one of the controlled power circuits.

* * * * *